May 8, 1934.  C. E. JOHNSON  1,957,783
PISTON RING
Filed Dec. 14, 1931

Inventor
Charles E. Johnson
By Liverance & Van Antwerp
Attorneys

Patented May 8, 1934

1,957,783

UNITED STATES PATENT OFFICE 1,957,783

PISTON RING

Charles E. Johnson, North Muskegon, Mich.

Application December 14, 1931, Serial No. 580,770

1 Claim. (Cl. 309—45)

This invention relates to piston rings and more particular to oil draining rings wherein any excess of oil may be scraped or gathered from the inner walls of a cylinder, carried to the bottom of the piston ring groove in which the ring is seated, and drained through the piston and thence back to the crank case of the engine in which the piston is located.

It is a primary object and purpose of the present invention to provide a particularly practical and effective oil draining ring and one in which the strength or tension of the ring is rendered practically uniform. The cutting of slots or passages through the ring weaken it at certain places, leaving other intermediate places of greater strength, and with my invention such intermediate stronger sections of the ring are reduced in strength so as to maintain the ring with substantially uniform strength and tension at all places in its length. The invention also provides for a ring equipped with a plurality of oil drainage passages which are made in such manner that the ring is in no section unduly weakened and at the same time combines the advantages of a slotted oil draining ring with a ring having a grooved face, with drainage passages therefrom, so as to better secure removal of excess oil, and at the same time the bearing face of the ring against the wall of the cylinder is reduced in width without sacrifice of the ring strength.

The invention may be understood from the following description, taken in connection with the accompanying drawing, in which, Fig. 1 is a horizontal section through the piston ring of my invention, the plane of the section being through the oil drainage slots cut through the ring.

Like reference characters refer to like parts in the different figures of the drawing.

Figure 1:
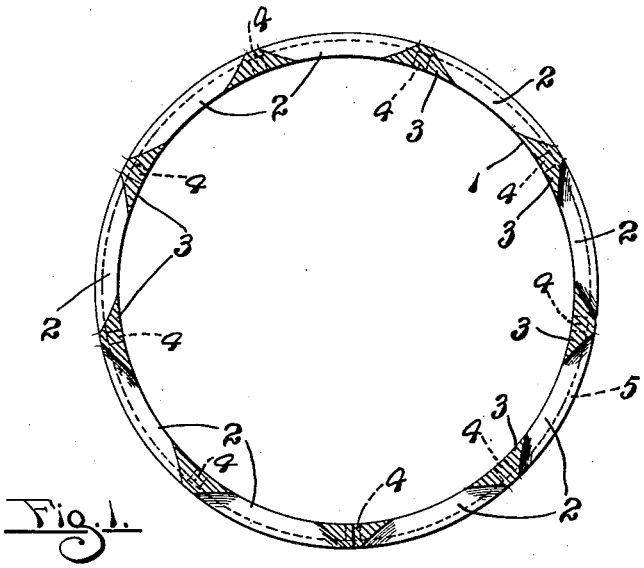
Figure 2:
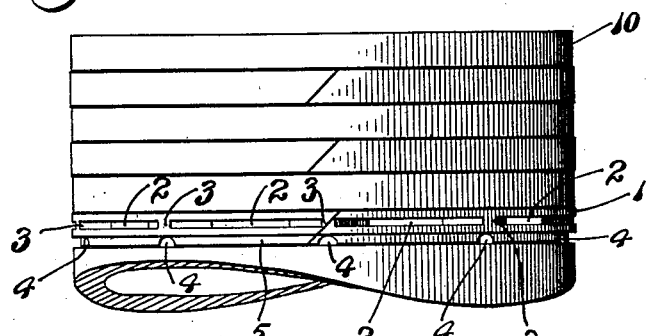
Fig. 2 is a fragmentary elevation showing a piston equipped with a ring of my invention.

The ring 1 is of a single piece, parted at one side, with a tendency to spring open at the parting, and when the ring is closed at the parting it is designed to be of circular form at its exterior circumferential surface so as to fit snugly against the inner wall of a cylinder and make an oil seal, the parting being closed so as not to affect the oil sealing properties of the ring. Through this ring in a plane between and parallel to the flat sides of the ring a plurality of spaced apart oil drainage slots 2 are cut of the shape best shown in Fig. 1. The slots are longest at the outer curved surface of the ring and are of less length where they cut through to the inner curved side of the ring. They terminate short of each other at the outer side of the ring whereby between adjacent ends of contiguous slots bridging pieces or posts 3 are left of a substantially triangular shape but each having an outer side flush with the outer curved surface of the ring.

This provides a ring which has been weakened in the places where the slots are cut and which has stronger sections in the parts between the slots. With my invention grooves 4 are cut or cast radially in the bottom of said stronger ring sections, which include the posts 3, and also a continuous annular groove, as indicated at 5, is cut or cast around the ring at its outer side and lower corner whereby the radial grooves 4, at their outer ends, join with the continuous annular groove 5 made in the ring. This reduces the strength of the stronger sections of the ring and provides, in addition to the drainage slots through the ring, an oil collecting groove 5 from which oil scraped from the cylinder walls may pass through the grooves 4, to the bottoms of the piston ring grooves in which the rings are located.

Figures 3, 4, 5:
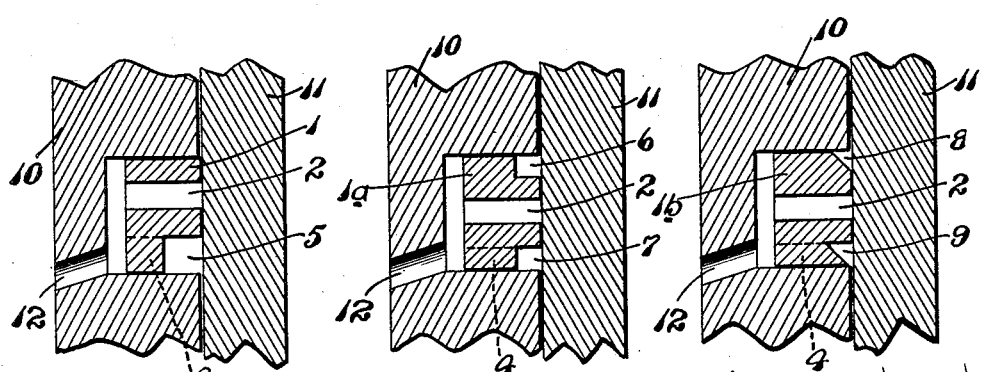
Fig. 3 is a fragmentary enlarged vertical section showing the ring of Figs. 1 and 2 located in a ring groove of a piston, and bearing against the wall of a cylinder.
Figs. 4 and 5 are fragmentary vertical sections, similar to that shown in Fig. 3, illustrating the slight modifications in the construction of the ring.

The construction of the ring described is shown in cross section in Fig. 3 where it will be noted that the plane of the slots 2 is somewhat above a plane midway between the opposite flat sides of the ring. The invention may also be embodied in a ring in cross section like that shown in Fig. 4, in which continuous annular grooves 6 and 7 are made around the outer curved sides of the ring at both its upper and lower corners, in which case the grooves 4 lead radially inwardly from the lower groove 7. In Fig. 5 the upper outer corner of the ring is chamfered, making a triangular shaped groove 8 when the ring is installed in a piston, while at the lower outer corner portions of the ring a triangular shaped groove 9 is cut continuously around the ring, the upper side of which is parallel with the slots 2 and the lower side of which extends downwardly and outwardly at an acute angle to the horizontal as shown. With this form of ring the bearing of the lower flat side of the ring against the lower side of the piston ring groove is not reduced as it is in the form of rings shown in Figs. 3 and 4. In both the forms of rings shown in Figs. 4 and 5 the grooves 4 extend from the lower grooves 7 and 9 radially inward as indicated in dotted lines, and the plane of the slots 2 is substantially midway between the upper and lower sides of the ring.

Rings of the character described, and as shown in Figs. 3, 4 and 5, are adapted to be located in piston ring grooves in pistons 10 and bear at their outer curved surfaces against the inner walls of cylinders 11; and drainage grooves 12 lead from the bottoms of the piston ring grooves through to the interior of the piston. It will be noted that the bearing surface of the ring against the wall of the cylinder in all cases is reduced and is less than the width of the ring without appreciable loss of strength or tension of the ring or any reduction of the strength of the ring beyond what it should be. As previously stated the grooves 4, made at the lower sides of the ring, are made at the places of greatest strength between the ends of the slots 2 providing oil passages for oil collected in the grooves 5, 7 or 9 and increasing the flexibility of the rings because of the removal of metal from the more rigid sections thereof.

The construction described is a particularly effective oil conserving ring and at the same time gains all the advantages of narrow bearing surface of the ring against the cylinder wall plus a substantially uniform strength of the ring continuous around it so that the flexibility in all parts of the ring will be substantially uniform. The invention is defined in the appended claim and is to be considered comprehensive of all forms of structure coming within its scope.

I claim:

A piston ring, having, a plurality of slots around the same cut therethrough, said slots being spaced from each other at adjacent ends leaving post portions integral with the ring between the ends of the slots, said ring at its lower face and lower corner having a continuous groove therein, the cross sectional area of the groove being constant entirely around the ring, and also having radial grooves extending inwardly from said continuous groove to the inner curved side of the ring, one radial groove being located under each of said post portions and medially thereof, said depth of the continuous groove being predetermined whereby the volume of the portion of the ring removed by the said radial groove bears a predetermined relationship to the volume of the ring remaining in the post whereby the strength of the ring at each of the said radial grooves is substantially the same as the strength of the ring between the said posts.

CHARLES E. JOHNSON.